(12) United States Patent
Kawata

(10) Patent No.: US 10,882,149 B2
(45) Date of Patent: Jan. 5, 2021

(54) INDEX APPARATUS FOR MACHINING CENTER

(71) Applicant: Kawata Chuck Manufacturing Co., Ltd., Kyoto (JP)

(72) Inventor: Yasuyuki Kawata, Kyoto (JP)

(73) Assignee: KAWATA CHUCK MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/568,354

(22) Filed: Sep. 12, 2019

(65) Prior Publication Data
US 2020/0108480 A1 Apr. 9, 2020

(30) Foreign Application Priority Data
Oct. 3, 2018 (JP) .................................. 2018-188423

(51) Int. Cl.
*B23Q 1/52* (2006.01)
*B23Q 16/02* (2006.01)

(52) U.S. Cl.
CPC ........... *B23Q 1/525* (2013.01); *B23Q 16/026* (2013.01); *B23Q 2230/002* (2013.01); *Y10T 279/13* (2015.01)

(58) Field of Classification Search
CPC ...... B23Q 1/525; B23Q 16/026; Y10T 279/13
See application file for complete search history.

(56) References Cited

U.S. PATENT DOCUMENTS

| 3,186,260 A | * | 6/1965 | Dugas | ..................... F16D 71/00 74/822 |
| 3,661,403 A | * | 5/1972 | Path | ...................... B23Q 16/04 279/5 |
| 4,884,474 A | * | 12/1989 | Kawata | .................. B23Q 16/06 74/813 L |
| 6,455,798 B2 | * | 9/2002 | Kawata | ................ B23Q 16/026 219/69.2 |
| 8,037,785 B2 | * | 10/2011 | Kawata | ................ B23Q 16/026 74/813 L |

(Continued)

FOREIGN PATENT DOCUMENTS

| JP | S60197347 | 10/1985 |
| JP | 2000-296441 | 10/2000 |

(Continued)

OTHER PUBLICATIONS

European Search Report in corresponding European Patent Application No. 19198536.5 dated Feb. 19, 2020.

*Primary Examiner* — Eric A. Gates
(74) *Attorney, Agent, or Firm* — Kirschstein, Israel, Schiffmiller & Pieroni, P.C.

(57) ABSTRACT

It is an object of the invention to provide a new push bar type of index apparatus which can hold and machine the work exactly while the machining center machines the work having a predetermined length even if the work is long. An index apparatus comprises first and second index tables 4a and 4b configured to hold a work 1. The apparatus comprises a push bar transmission mechanism configured to rotate the first index table 4a in response to the movement of the push bar 7. The work 1 and the second index table 4b are rotated by the rotation of the first index table 4a integrally so as to index the work 1.

1 Claim, 5 Drawing Sheets

(56) References Cited

U.S. PATENT DOCUMENTS

| | | | |
|---|---|---|---|
| 8,336,867 B1* | 12/2012 | Warth | B25B 1/24 |
| | | | 269/271 |
| 9,120,157 B2* | 9/2015 | Kawata | B23Q 16/06 |
| 2012/0152069 A1* | 6/2012 | Hyatt | B23B 3/065 |
| | | | 82/1.11 |

FOREIGN PATENT DOCUMENTS

| | | | |
|---|---|---|---|
| JP | 2000301430 A | * | 10/2000 |
| JP | 3571605 | | 9/2004 |
| JP | 2009-119568 | | 6/2009 |

* cited by examiner

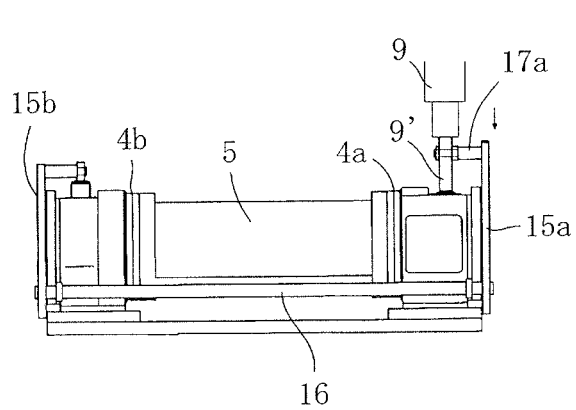
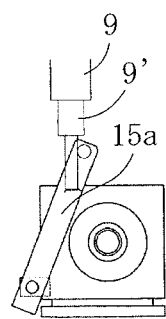
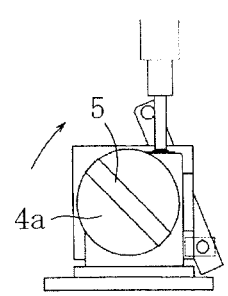
Fig. 4A  Fig. 4B  Fig. 4C
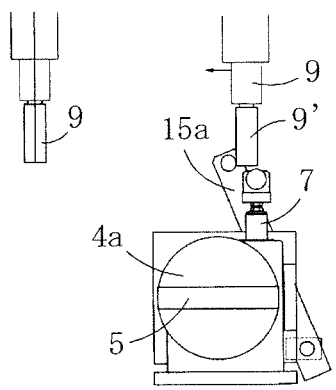
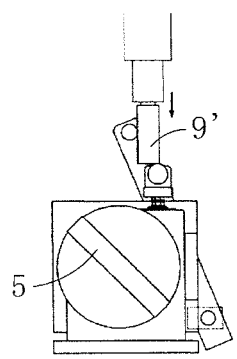
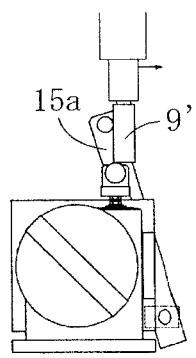
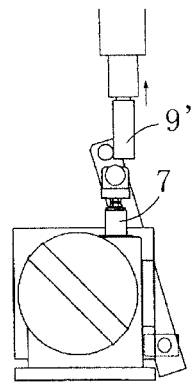
Fig. 5A  Fig. 5B  Fig. 5C  Fig. 5D

INDEX APPARATUS FOR MACHINING CENTER

FIELD OF THE INVENTION

The apparatus relates to an index apparatus for a machining center which machines a work having a predetermined length.

BACKGROUND

Patent Document 1 discloses an index apparatus of push bar type for a machining center. The index apparatus includes only one housing which is mounted on a main table. The apparatus further includes only one index table which is supported on a housing for rotation. A work is held on the index table. The apparatus is a push bar type which includes a push bar supported on the housing for movement. An NC device is configured to make an extra relative movement between a spindle and the main table other than a machining relative movement, so that the push bar can be moved by the extra relative movement. A push bar transmission mechanism is configured to rotate the index table in response to the movement of the push bar so as to index the work. And then, the NC device makes the machining relative movement between the spindle and the main table so as to machine the work with a tool.

By the way, there is a case that the work is long. In this case, the work is held on the index table at one end of the work. The tool has to be pressed against the work so as to machine the work, so that the work is affected by big weight and force while machining it. Thus, the only one index table has to bear the big weight and force. However, the only one index table cannot always hold and machine the work exactly.

It is therefore an object of the invention to provide a new push bar type of index apparatus which can hold and machine the work exactly while the machining center machines the work having a predetermined length even if the work is long.

Patent Document 1: JP3571605

SUMMARY OF THE INVENTION

An index apparatus for an NC machining center which machines a work having a predetermined length, the apparatus comprising:
a main table;
first and second housings mounted on the main table and away from each other;
first and second index tables configured to hold the work and supported on the first and second housing for rotation;
a push bar supported on the first housing for movement;
an NC device comprising a spindle, the NC device configured to make an extra relative movement between the spindle and the main table other than a machining relative movement between the spindle and the main table in such a manner that the push bar is moved by the extra relative movement; and
a push bar transmission mechanism disposed in the first housing and between the push bar and the first index table, the push bar transmission mechanism configured to rotate the first index table in response to the movement of the push bar; wherein
the work and the second index table are rotated by the rotation of the first index table integrally so as to index the work.

The index apparatus further comprising:
a first locking mechanism mounted in the first housing, the first locking mechanism configured to lock the first index table, the first locking mechanism configured to unlock the first index table when the push bar is moved;
a second locking mechanism mounted in the second housing, the second locking mechanism configured to lock the second index table; and
a relative movement transmission mechanism disposed between the first and second housings, the relative movement transmission mechanism configured to unlock the second index table in response to the extra relative movement between the spindle and the main table; wherein
the push bar transmission mechanism is configured to rotate the first index table after the first and second index tables are unlocked.

BRIEF DESCRIPTION OF THE DRAWINGS

FIG. 4A is an elevational view of a work rotated of FIG. 1.
FIG. 4B is a right-side view of the apparatus of FIG. 4A.
FIG. 4C is a sectional view of the apparatus of FIG. 4A.
FIG. 5A is a sectional view of another embodiment.
FIG. 5B is a sectional view at a step next to FIG. 5A.
FIG. 5C is a sectional view at a step next to FIG. 5B.
FIG. 5D is a sectional view at a step next to FIG. 5C.

DETAILED EXPLANATION OF THE EMBODIMENTS

An index apparatus for a machining center according to the present invention will be explained below with reference to the drawings.

Figure 1:
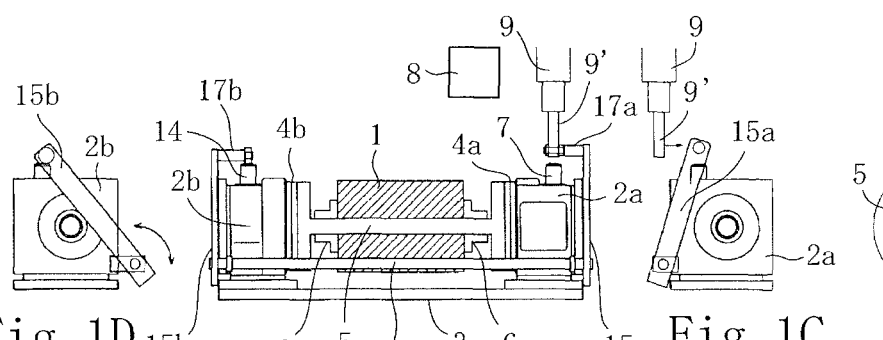
FIG. 1A is an elevational view of an embodiment of the invention.
FIG. 1B is a plan view of the apparatus of FIG. 1A.
FIG. 1C is a right-side view of the apparatus of FIG. 1A.
FIG. 1D is a left-side view of the apparatus of FIG. 1A.
FIG. 1E is a sectional view of the apparatus of FIG. 1A.
FIG. 1F is a right-side view of a lever moved of FIG. 1C.
FIG. 1G is a left-side view of the lever moved of FIG. 1D.
FIG. 1H is a sectional view of the apparatus of FIG. 1F.

As shown in FIG. 1, an index apparatus for a machining center is configured to machine works 1. The works 1 have a predetermined length. The apparatus comprises a main table 3. The apparatus comprises a first housing 2a and a second housing 2b which are away from each other and mounted on the main table 3. The apparatus comprises a first index table 4a and a second index table 4b which are supported on the first and second housings 2a and 2b for rotation and are faced to each other. The first and second index tables 4a and 4b are away from each other longitudinally of the works 1. The works 1 are held on the first and second index tables 4a and 4b. The apparatus for example comprises a plate 5 which is disposed between the first and second index tables 4a and 4b. The plate 5 is connected to the first and second index tables 4a and 4b at opposite ends of the plate 5 with a connecting means, such as bolts. The works 1 are disposed on upper and lower surfaces of the plate 5 respectively. The works 1 are fixed to the plate 5 with a fixing tool 6, such as vices. Thus, the works 1 are held by the first and second index tables 4a and 4b and the plate 5. The work 1 may be disposed on one surface of the plate 5 and fixed to the fixing tool 6. The first housing 2a, the main table 3 and the first index table 4a has the same structure as those of Patent Document 1. The first and second index tables 4a and 4b are disposed coaxially with each other.

The push bar 7 is supported on the first housing 2a for rotation, as in the case of the push bar of Patent Document 1. An NC device 8 is configured to make an extra relative movement between a spindle 9 and the main table 3 other than a machining relative movement between the spindle 9 and the main table 3, so that the push bar 7 can be moved by the extra relative movement, as in the case of Patent Document 1. A tool 9' is attached to and held on a spindle 9 so as to machine the works 1, as in the case of Patent Document 1.

Figure 2:
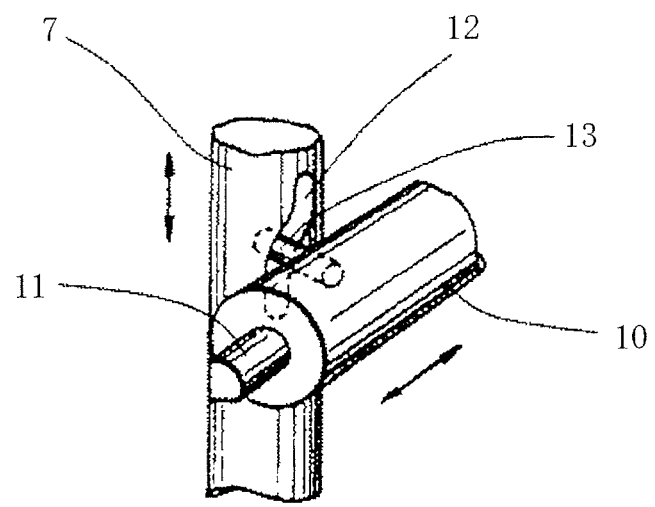
FIG. 2 is a perspective view of a first locking mechanism of the apparatus of FIG. 1.

A first locking mechanism is mounted in the first housing 2a. The first index table 4a is locked by the first locking mechanism, and the first index table 4a is unlocked by the movement of the push bar 7. As shown in FIG. 2, the first locking mechanism comprises a rod 10. The rod 10 has a tooth-shaped portion 11 at its one end. The tooth-shaped portion 11 is engaged with a gear mounted on and fixed to the first index table 4a so as to lock the first index table 4a. The first locking mechanism comprises a cam groove 12 formed in the push bar 7. The first locking mechanism is provided with a pin 13 which is mounted on the rod 10 and inserted into the cam groove 12. The cam groove 12 extends axially of the push bar 7 to be inclined obliquely. The rod 10 is moved by the cam groove 12 and the pin 13 when the push bar 7 is moved. The tooth-shaped portion 11 is therefore disengaged from the gear so as to unlock the first index table 4a, as in the case of Patent Document 1.

A second locking mechanism is mounted in the second housing 2b. The second index table 4b is locked by the second locking mechanism. The push bar 14 is supported on the second housing 2b for rotation, as in the case of the push bar 7 and the first housing 2a. The second locking mechanism comprises a rod, as in the case of the first locking mechanism. The rod has a tooth-shaped portion at its one end. The tooth-shaped portion is engaged with a gear mounted on and fixed to the second index table 4b so as to lock the second index table 4b.

The apparatus comprises a relative movement transmission mechanism which is disposed between the first and second housings 2a and 2b. The relative movement transmission mechanism unlocks the second index table 4b in response to the extra relative movement when the extra relative movement between a spindle 9 and the main table 3 occurs. The relative movement transmission mechanism for example comprises a pair of levers 15a and 15b. The levers 15a and 15b and a connecting bar 16 are disposed across the first and second housings 2a and 2b. The levers 15a and 15b are connected respectively with the connecting bar 16. The connecting bar 16 is extended horizontally and supported on the first and second housings 2a and 2b for rotation. The levers 15a and 15b extends vertically from opposite ends of the connecting bar 16. The lower ends of the levers 15a and 15b are attached to the connecting bar 16. Rollers 17a and 17b are attached to the upper ends of the levers 15a and 15b respectively. The roller 17a is extended horizontally. The roller 17b is also extended horizontally and engaged with the push bar 14. The rollers 17a and 17b, the levers 15a and 15b and the connecting bar 16 unlocks the second index table 4b in response to the extra relative movement when the extra relative movement between the spindle 9 and the main table 3 is made, as described latter.

Figure 3:
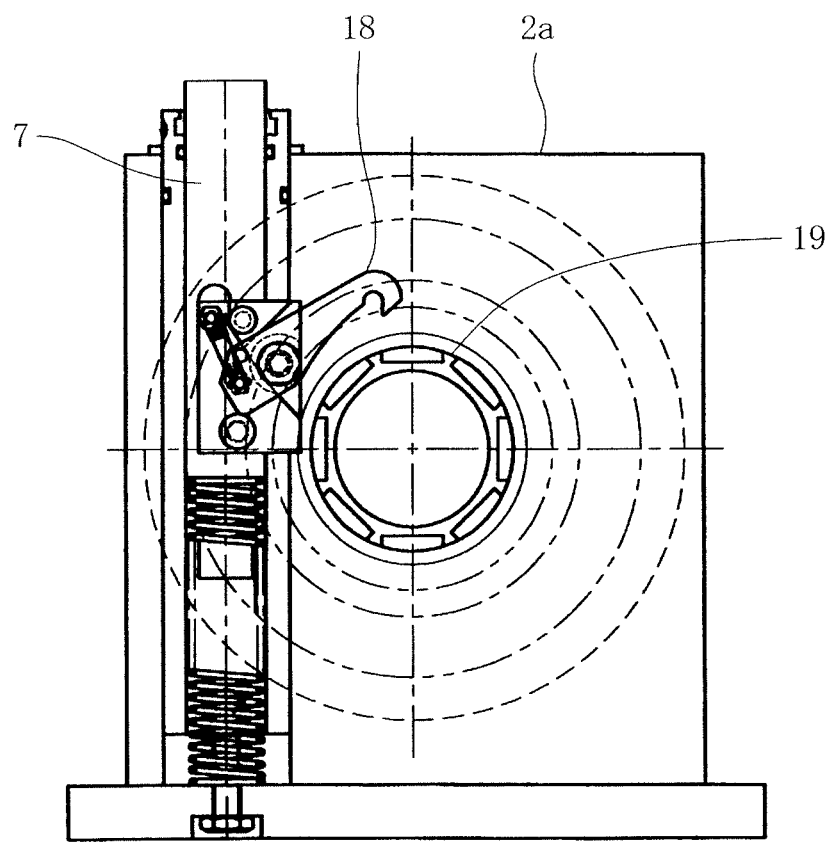
FIG. 3 is a sectional view of a push bar transmission mechanism of the apparatus of FIG. 1.

The apparatus comprises a push bar transmission mechanism which is mounted in the first housing 2a and disposed between the push bar 7 and the first index table 4a. The push bar transmission mechanism rotates the first index table 4a in response to the movement of the push bar 7. As shown in FIG. 3, for example, the push bar transmission mechanism comprises a feed pawl 18 to which the push bar 7 is attached. The first index table 4a comprises a ratchet wheel 19. The feed pawl 18 is engaged with the tooth of the ratchet wheel 19 by the movement of the push bar 7, so that the ratchet wheel 19 and the first index table 4a are rotated by the movement of the feed pawl 18, as in the case of Patent Document 1.

The first index table 4a is rotated by the push bar transmission mechanism after the first and second index tables 4a and 4b are unlocked, as described latter.

At first, the NC device 8 makes the extra relative movement between the spindle 9 and the main table 3, so that the spindle 9 and the tool 9' are moved horizontally and toward the roller 17a and the push bar 7. Then, the spindle 9 or the tool 9' is engaged with the roller 17a above the push bar 7, so that the roller 17a is pressed and moved by the spindle 9 or the tool 9' so as to move the lever 15a (FIG. 1F). Thus, the connecting bar 16 is rotated, so that the lever 15b is moved, and then the roller 17b is lowered. The push bar 14 is pressed and lowered by the roller 17b (FIG. 1G). As in the case of the first locking mechanism, the tooth-shaped portion is therefore disengaged from the gear so as to unlock the second index table 4b with the second locking mechanism.

And then, the NC device 8 further makes the extra relative movement between the spindle 9 and the main table 3, so that the spindle 9 and the tool 9' are lowered toward the push bar 7, as in the case of Patent Document 1. Thus, the push bar 7 is pressed and lowered by the tool 9', so that the first index table 4a is unlocked by the first locking mechanism while the second index table 4b is unlocked. The push bar 7 is further pressed and lowered by the tool 9', so that the first index table 4a is rotated by the push bar transmission mechanism. Accordingly, the first index table 4a as well as the plate 5, the works 1 and the second index table 4b are rotated integrally. And then, the spindle 9 and the tool 9' is moved upwardly from the push bar 7, and the push bar 7 is pressed upwardly so as to be returned by the spring, as in the case of Patent Document 1.

And then, the push bar 7 is further pressed and moved downwardly by the tool 9', and then pressed and moved upwardly by the spring, so that the index tables 4a and 4b is rotated again and again. Thus, as shown in FIG. 4, the apparatus can therefore rotate the first and second index tables 4a and 4b at an angle in response to the above movements over and over, to index the works 1.

And then, the spindle 9 and the tool 9' are moved upwardly from the push bar 7, and away from the roller 17a so as to be returned to the position of FIG. 1. Thus, the first index table 4a is locked by the first locking mechanism, and the second index table 4b is locked by the second locking mechanism. And then, the NC device 8 makes the machining relative movement between the spindle 9 and the main table 3, so that the tool 9' is pressed against the works 1 so as to machine the works 1 with the tool 9'.

In the case of the index apparatus, the works 1 are held on the first and second index tables 4a and 4b. The tool 9' is pressed against the works 1 so as to machine the works 1 with the tool 9' after the works 1 are indexed and the first and second index tables 4a and 4b are locked. Thus, there is no problem even if the works 1 are long. The works 1 are affected by big weight and force when machining. The apparatus can divide the weight and force into the first and second index tables 4a and 4b respectively so as to hold and machine the works 1 exactly.

As shown in FIG. 5, the spindle 9 and the tool 9' are moved horizontally, so that the second index table 4b is unlocked by the relative movement transmission mechanism (FIG. 5A). Then, the spindle 9 and the tool 9' are moved downwardly toward the push bar 7 so as to unlock the first index table 4a. Then, the first and second index tables 4a and 4b are rotated by the push bar transmission mechanism so as to index the works 1 (FIG. 5B). Then, the spindle 9 and the tool 9' are moved horizontally so as to lock the second index table 4b (FIG. 5C). And then, the spindle 9 and the tool 9' may be moved upwardly from the push bar 7 so as to lock the first index table 4a (FIG. 5D).

Figure 6B:
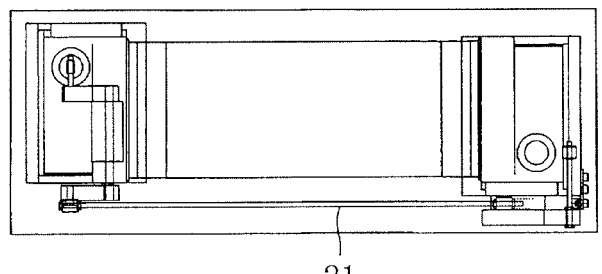
FIG. 6B is a plan view of the apparatus of FIG. 6A.
Figure 6A:
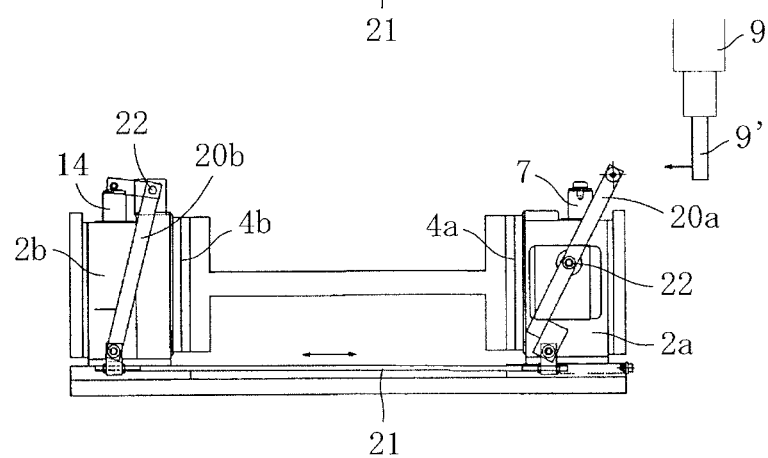
FIG. 6A is an elevational view of another embodiment.
Figure 6C:
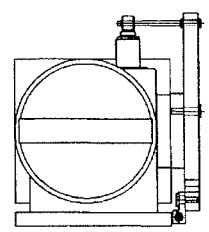
FIG. 6C is a right-side view of the apparatus of FIG. 6C.

In the case of the embodiment of FIG. 6, the relative movement transmission mechanism comprises a pair of levers 20a and 20b which are connected by a connecting bar 21. The first and second housings 2a and 2b comprise pins 22 on which the levers 20a and 20b are supported for movement. The spindle 9 and the tool 9' are moved horizontally so as to move the lever 20a. Thus, the connecting bar 21 is moved by the movement of the lever 20a so as to move the lever 20b. As a result, the push bar 14 is pressed and moved downwardly so as to unlock the second index table 4b.

Figure 7:
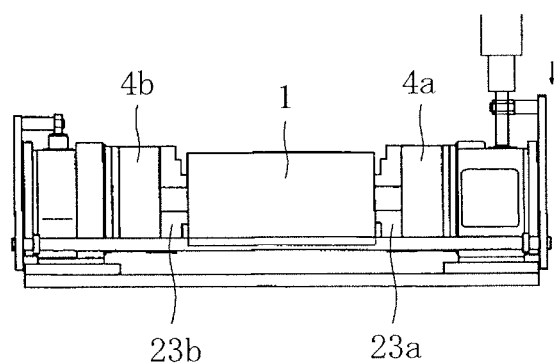
FIG. 7 is an elevational view of another embodiment.

In the case of the embodiment of FIG. 7, the first and second index tables 4a and 4b comprise first and second scroll chucks 23a and 23b. The work 1 is griped by and held on the first and second scroll chucks 23a and 23b at opposite ends of the work 1. The other structures are the same as in the case of FIG. 1.

The work 1 may be fixed to the first and second index tables 4a and 4b directly at opposite ends of the work 1 so as to hold the work 1.

The relative movement transmission mechanism can be used for the other purposes when the relative movement between the spindle 9 and the main table 3 occurs. The index apparatus for example may comprise a cover for covering the apparatus partially, and the cover can be also moved by the relative movement transmission mechanism.

DESCRIPTION OF REFERENCE NUMBERS 1 work
2a, 2b housing
3 main table
4a, 4b index table
7 push bar
8 NC device
9 spindle
10 rod
14 push bar
15a, 15b, 20a, 20b lever
16, 19 connecting bar

What is claimed is:

1. An index apparatus for an NC machining center which machines a work having a predetermined length, the apparatus comprising:
   a main table;
   first and second housings mounted on the main table and away from each other;
   first and second index tables configured to hold the work and supported on the first and second housings for rotation;
   a push bar supported on the first housing for movement;
   an NC device including a spindle, the NC device being configured to make an extra relative movement between the spindle and the main table other than a machining relative movement between the spindle and the main table in such a manner that the push bar is moved by the extra relative movement;
   a push bar transmission mechanism mounted in the first housing and disposed between the push bar and the first index table, the push bar transmission mechanism being configured to rotate the first index table in response to the movement of the push bar;
   a first locking mechanism mounted in the first housing, the first locking mechanism being configured to lock the first index table, the first locking mechanism being configured to unlock the first index table when the push bar is moved;
   a second locking mechanism mounted in the second housing, the second locking mechanism being configured to lock the second index table; and
   a relative movement transmission mechanism disposed between the first and second housings, the relative movement transmission mechanism being configured to unlock the second index table in response to the extra relative movement between the spindle and the main table; wherein
   the work and the second index table are rotated by the rotation of the first index table integrally so as to index the work, and
   the push bar transmission mechanism is configured to rotate the first index table after the first and second index tables are unlocked.

* * * * *